US012384178B2

(12) United States Patent
Tsuji

(10) Patent No.: US 12,384,178 B2
(45) Date of Patent: Aug. 12, 2025

(54) INKJET RECORDING APPARATUS AND HEAD POSITION DETERMINING METHOD

(71) Applicant: KYOCERA Document Solutions Inc., Osaka (JP)

(72) Inventor: Shuntaro Tsuji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 160 days.

(21) Appl. No.: 18/185,261

(22) Filed: Mar. 16, 2023

(65) Prior Publication Data

US 2023/0294435 A1 Sep. 21, 2023

(30) Foreign Application Priority Data

Mar. 17, 2022 (JP) ................................ 2022-042313

(51) Int. Cl.
*B41J 25/308* (2006.01)

(52) U.S. Cl.
CPC .................................. *B41J 25/308* (2013.01)

(58) Field of Classification Search
CPC ...... B41J 25/308; B41J 11/0095; B41J 29/38; B41J 19/145; B41J 2/2132; B41J 29/393; B41J 11/008; B41J 11/009; B41J 2/04573; B41J 2/2142
See application file for complete search history.

(56) References Cited

U.S. PATENT DOCUMENTS

2020/0247159 A1 8/2020 Sakurada et al.
2021/0331485 A1* 10/2021 Suetsugu ............. B41J 2/04541

FOREIGN PATENT DOCUMENTS

JP 2020121504 A 8/2020

* cited by examiner

*Primary Examiner* — Jannelle M Lebron
(74) *Attorney, Agent, or Firm* — Alleman Hall & Tuttle LLP

(57) ABSTRACT

An inkjet recording apparatus captures an image of a recording surface of a recording medium including a test pattern recorded on the recording surface, calculates an interval between the test pattern and a reference position on the recording surface based on the image of the recording surface, and determines a height position of the recording head according to the recording medium based on the interval. The inkjet recording apparatus outputs information related to the determined height position.

4 Claims, 8 Drawing Sheets

INKJET RECORDING APPARATUS AND HEAD POSITION DETERMINING METHOD

INCORPORATION BY REFERENCE

This application is based upon and claims the benefit of priority from the corresponding Japanese Patent Application No. 2022-042313 filed on Mar. 17, 2022, the entire contents of which are incorporated herein by reference.

The present disclosure relates to an inkjet recording apparatus that records an image on a recording medium by ejecting ink from a recording head onto the recording medium, and a head position determining method that determines a position of the recording head.

BACKGROUND

Generally, an inkjet recording apparatus that records an image on a recording medium such as fabric or paper by ejecting ink from nozzles of a recording head is known. Printing an image on a fabric such as cloth is called textile printing, and an inkjet recording apparatus that performs textile printing is called a textile printing apparatus or a textile printer. In the inkjet recording apparatus, when a thick recording medium is set in the apparatus and printed, a nozzle surface of the recording head may come into contact with a surface of the recording medium. Therefore, as a conventional apparatus, a recording apparatus capable of determining a distance between the nozzle surface and the recording medium is known.

SUMMARY

An inkjet recording apparatus according to one aspect of the present disclosure includes a recording head, a pattern print processing portion, an imaging portion, a calculation processing portion, and a determination processing portion. In addition, the inkjet recording apparatus includes either one of an output processing portion, or a head position adjustment portion and a position adjustment processing portion. The recording head ejects ink onto a recording medium while moving in a predetermined scanning direction. The pattern print processing portion causes the recording head to record a specified test pattern on a recording surface of the recording medium. The imaging portion captures an image of the recording surface including the test pattern. The calculation processing portion calculates an interval between the test pattern and a reference position on the recording surface based on the image of the recording surface. The determination processing portion determines a height position of the recording head according to the recording medium based on the interval.

The output processing portion outputs information related to the height position determined by the determination processing portion.

The head position adjustment portion is configured to be able to adjust the height position by changing a relative position of the recording head with respect to a support surface of the recording medium. The position adjustment processing portion causes the head position adjustment portion to change the relative position of the recording head based on the height position determined by the determination processing portion.

A head position determining method according to another aspect of the present disclosure includes a test pattern printing step, an imaging step, an interval calculation step, and a height position determination step. The test pattern printing step records a specified test pattern on a recording surface of a recording medium by ejecting ink from a recording head while moving the recording head in a predetermined scanning direction. The imaging step captures an image of the recording surface including the test pattern. The interval calculation step calculates an interval between the test pattern and a reference position on the recording surface based on the image of the recording surface. The height position determination step determines a height position of the recording head according to the recording medium based on the interval.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments according to the present disclosure will be described below with reference to the drawings. Note that the embodiments described below are examples of implementing techniques according to the present disclosure and do not limit the technical scope of the present disclosure.

Figure 1:
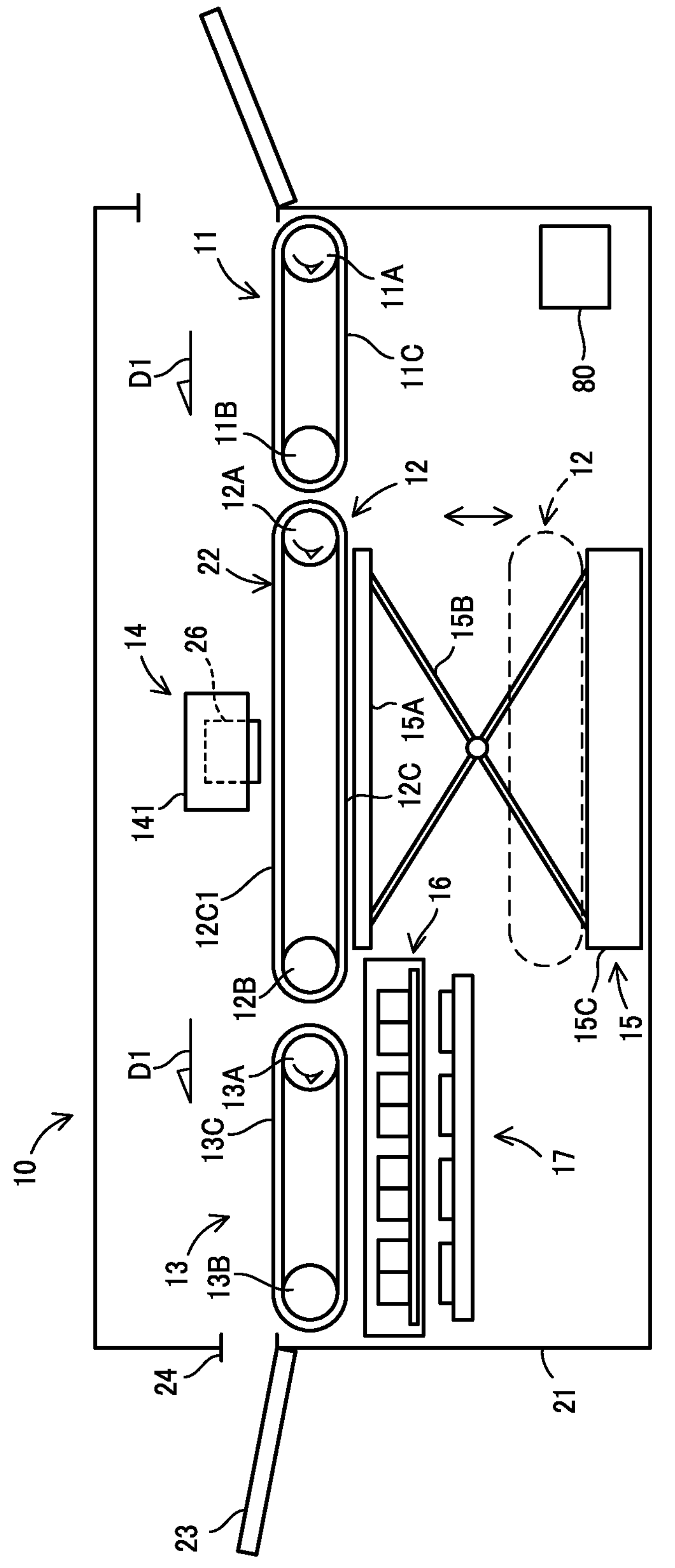
FIG. 1 is a diagram showing a structure of an inkjet recording apparatus of an embodiment according to the present disclosure.
Figure 2:
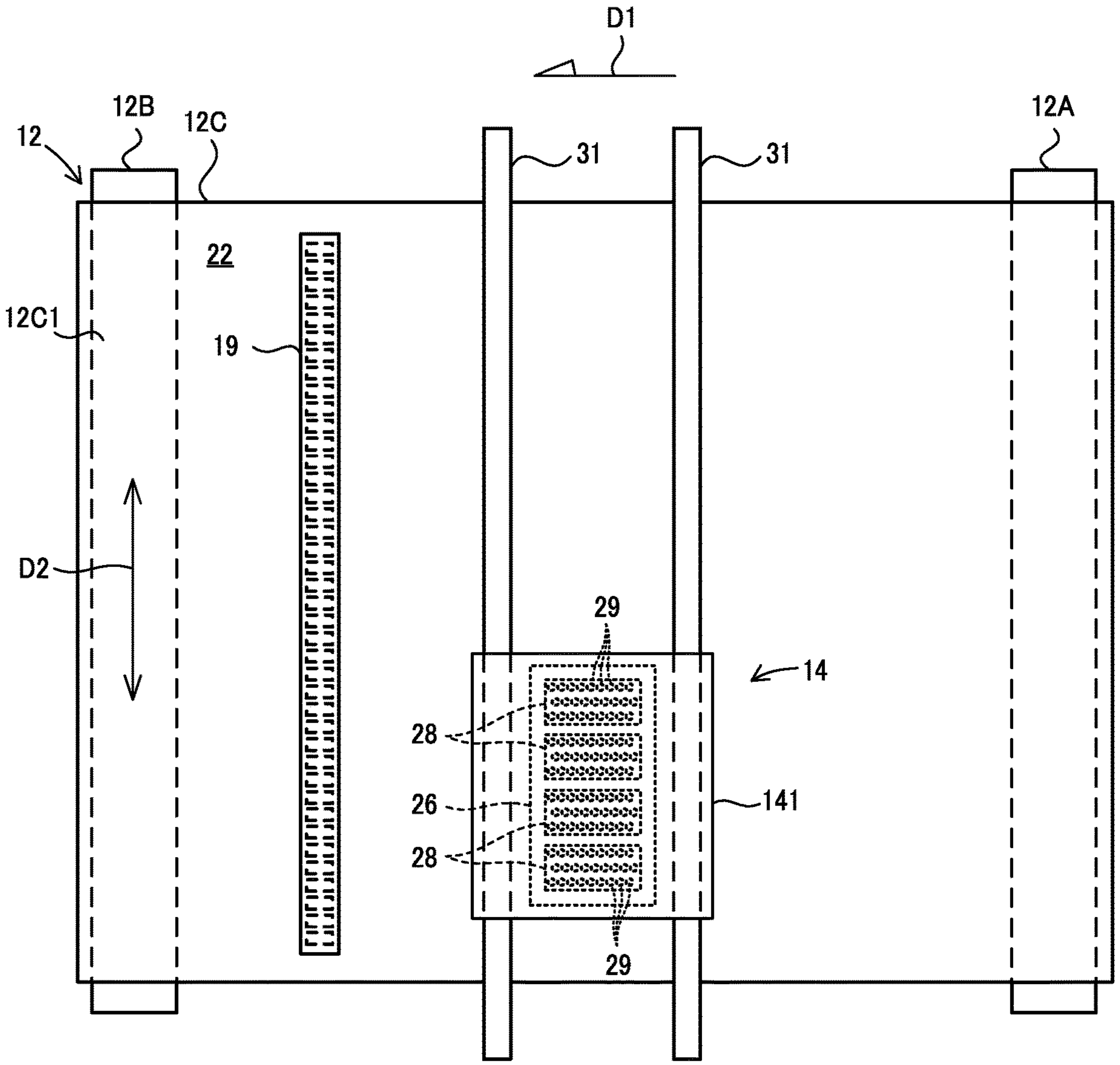
FIG. 2 is a view as seen from above a conveying unit and a recording unit of the inkjet recording apparatus shown in FIG. 1.
Figure 3:
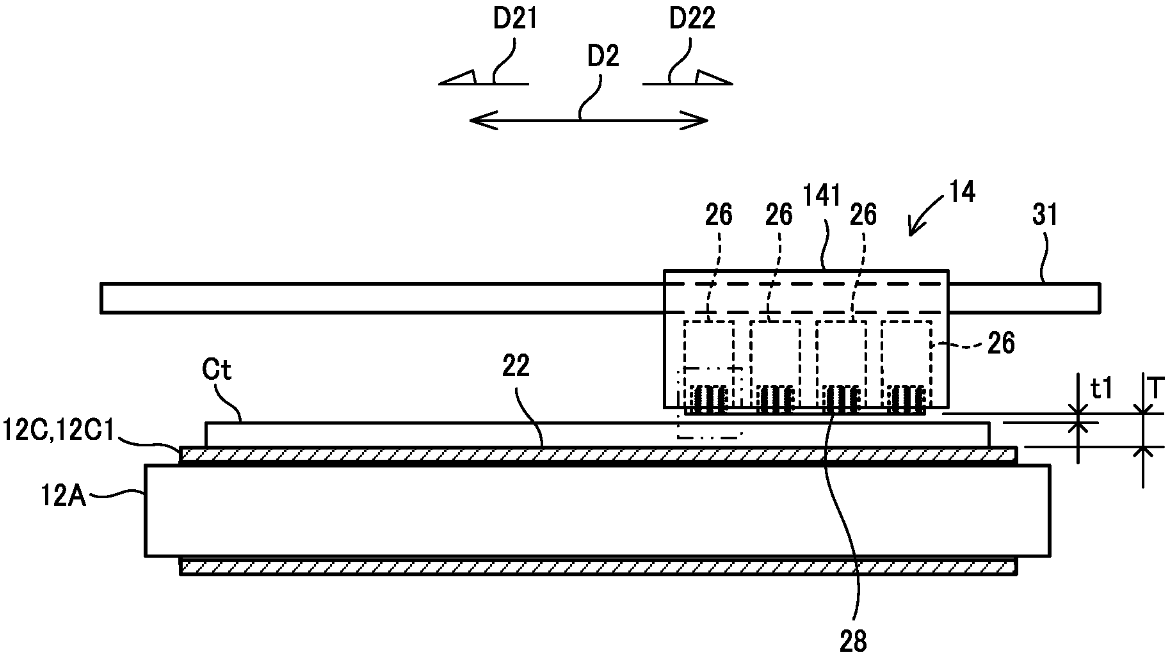
FIG. 3 is a view, as seen from a downstream side in the conveying direction of a recording medium, of the conveying unit and the recording unit of the inkjet recording apparatus shown in FIG. 1.

An inkjet recording apparatus 10 (hereinafter abbreviated as "recording apparatus 10") of an embodiment according to the present disclosure will be described with reference to FIGS. 1 to 3. FIG. 1 is a diagram showing a structure of the recording apparatus 10. FIG. 2 is a view as seen from above of a conveying unit 12 and a recording unit 14 of the recording apparatus 10. FIG. 3 is a view of the conveying unit 12 and the recording unit 14 of the recording apparatus 10 as seen from a downstream side in a conveying direction D1 of a recording medium Ct.

The recording apparatus 10 is an apparatus that, based on input image data, records an image on a sheet-like recording medium Ct such as a non-woven fabric or cloth by ejecting ink onto an upper surface (recording surface) of the recording medium Ct (see FIG. 3) and dyeing the fibers of the recording medium Ct with ink. In this embodiment, the recording apparatus 10 will be described as an inkjet recording apparatus mainly used for textile printing. That is, the recording apparatus 10 is a so-called textile printing machine (textile printer). Here, the recording medium Ct is merely an example of a recording medium according to the present disclosure, and is a sheet-like fabric such as non-woven fabric or cloth. Note that, in this embodiment, for example, various types of paper having different thicknesses may be applied as other examples of recording media on which images are recorded.

As shown in FIG. 1, the recording apparatus 10 includes a feed unit 11, a conveying unit 12, a discharge unit 13, a recording unit 14, a raising/lowering mechanism 15 (an example of a head position adjustment portion according to the present disclosure), a maintenance unit 16, a cap unit 17, an operation display portion 18 (an example of a specified display portion according to the present disclosure), an imaging portion 19 (an example of an imaging portion according to the present disclosure), a control device 80, and a body frame 21 that accommodates or supports these units, and the like.

The feed unit 11 has a driving roller 11A, a driven roller 11B, and an annular belt 11C stretched over the driving roller 11A and the driven roller 11B. The driving roller 11A and the driven roller 11B are horizontally spaced apart, and thus the annular belt 11C extends horizontally. A recording medium Ct on which an image is to be recorded is set on an upper surface of the annular belt 11C. The drive roller 11A is connected to a motor (not shown) via a transmission member such as a gear or belt. The drive roller 11A is rotationally driven in the counterclockwise direction in FIG. 1 by driving and controlling the motor by a control signal from a control device 80 of the recording apparatus 10.

Thus, the recording medium Ct held on the upper surface of the annular belt 11C is conveyed in a conveying direction D1.

The conveying unit 12 is provided further on the downstream side than the feed unit 11 in the conveying direction D1. The conveying unit 12 supports the recording medium Ct and conveys the recording medium Ct toward the downstream side in the conveying direction D1. That is, the conveying unit 12 functions as a support portion that supports the recording medium Ct, and also functions as a conveying portion that conveys the recording medium Ct in the conveying direction D1.

The conveying unit 12 has a driving roller 12A, a driven roller 12B, and an annular belt 12C stretched over the driving roller 12A and the driven roller 12B. The conveying unit 12 is arranged at the same position in the height direction as the feed unit 11 so as to be horizontal with the feed unit 11. In addition, in the conveying unit 12 as well, the drive roller 12A is connected to a motor (not shown) via a transmission member such as a gear or belt. The drive roller 12A is rotationally driven by the motor being driven and controlled by a control signal from the control device 80. Thus, the recording medium Ct supported by a conveying surface 22 (an example of a supporting surface according to the present disclosure) of the annular belt 12C is conveyed in the conveying direction D1. Here, the conveying surface 22 is an upper surface of an upper portion (hereinafter referred to as "belt upper portion") 12C1 of the annular belt 12C.

In the present embodiment, when a recording head 26 (an example of a recording head according to the present disclosure) of the recording unit 14 conveys a predetermined recording area on an upper recording surface of the recording medium Ct to a recording position (position below the recording head 26), conveying the recording medium Ct is paused. After that, the recording unit 14 is moved back and forth in a scanning direction D2 (see FIG. 2) from a specified standby position. Note that the scanning direction D2 is a direction perpendicular to the conveying direction D1 of the recording medium Ct.

While the recording unit 14 moves back and forth in the scanning direction D2, the recording head 26 ejects ink from nozzles 29 (see FIG. 2) toward the recording area. Thus, an image is recorded with ink in the recording area. After that, the recording medium Ct is conveyed again in the conveying direction D1 in order to convey the next recording area on the recording medium Ct to the recording position. When the next recording area reaches the recording position, conveying is paused again, and the ink ejection operation by the recording head 26 is performed. That is, the recording medium Ct is intermittently conveyed in the conveying direction D1 each time image recording is performed by the recording head 26. A specified image is recorded on the recording surface of the recording medium Ct by repeating the intermittent conveying operation of the recording medium Ct and the ejection operation of the ink by the recording head 26.

The recording unit 14 records an image on the recording surface of the recording medium Ct by ejecting ink onto the recording surface of the recording medium Ct while moving back and forth in the scanning direction D2. The recording unit 14 is supported at a position a specified interval above the conveying unit 12 so as to be able to move back and forth in the scanning direction D2.

The recording unit 14 includes a carriage 141, four recording heads 26 held by the carriage 141, and a motor 25 for applying a driving force to the carriage 141 to move the carriage 141 back and forth in the scanning direction D2. The carriage 141 is supported by two guide rails 31 (see FIG. 2) provided on the body frame 21 so as to be able to freely move in the scanning direction D2. The carriage 141 is connected to the motor 25 (see FIG. 5) via a transmission member such as gear or belt. The recording unit 14 moves back and forth in the scanning direction D2 by the motor 25 being driven and controlled in the forward rotation direction or the reverse rotation direction by a control signal from the control device 80.

The recording heads 26 are respectively connected to corresponding ink tanks (not shown) by ink tubes (not shown). Inks of four colors (cyan, magenta, yellow, and black) stored in the ink tanks are supplied to the recording heads 26 of the corresponding colors through the ink tubes. Note that the recording heads 26 in this embodiment are an example of a recording head according to the present disclosure.

A lower surface of each recording head 26 is an ink ejection surface 28 on which a plurality of nozzles 29 are formed. That is, the lower surface of the recording head 26 is provided with an ink ejection surface 28 on which a plurality of nozzles 29 are formed. A plurality of rows of nozzles 29 are formed along the conveying direction D1. Each nozzle 29 has a lower opening. The lower opening is an ink ejection port for ejecting ink droplets onto the surface of the recording medium Ct.

The recording head 26, by being controlled by a control signal from the control device 80 (see FIG. 1), ejects ink droplets from the nozzles 29 toward the recording surface of the recording medium Ct according to image data received from an external computer. Thus, a color image is recorded on the recording medium Ct on the annular belt 12C with four colors of ink, cyan, magenta, yellow, and black.

Note that the recording unit 14 is not limited to a configuration having a plurality of recording heads 26 corresponding to each color, and, for example, may be configured to have a plurality of recording heads 26 each having the same color, or may be configured to have one recording head 26 to record a monochromatic image on the recording medium Ct.

As shown in FIG. 3, an interval T is provided in the height direction between the ink ejection surface 28 of the recording head 26 and the conveying surface 22 of the annular belt 12C. That is, the head height H of the ink ejection surface 28 of the recording head 26 from the conveying surface 22 (the height position of the recording head 26) is determined so that the interval T is formed between the ink ejection surface 28 and the conveying surface 22. In other words, the head height H is the distance in the height direction from the conveying surface 22 to the ink ejection surface 28.

The interval T is an interval that allows the recording medium Ct to be conveyed in the conveying direction D1 without the recording surface of the recording medium Ct on the conveying surface 22 coming into contact with the ink ejection surface 28, and, for example, the interval T is a distance obtained by adding a specified design interval t0 (for example, 1 mm) to the thickness of the recording medium Ct. The design interval t0 is an optimum value for ensuring image quality equal to or higher than a predetermined reference level. That is, the optimum head height H is a distance obtained by adding the design interval t0 to the thickness of the recording medium Ct, and an optimum height position of the recording head 26 is a position above the conveying surface 22 by the distance.

In a case where the thickness of the recording medium Ct on which an image is to be recorded changes, a separation distance t1 (see FIG. 3) between the ink ejection surface 28 and the recording surface also changes, and the separation distance t1 deviates from the designed interval t0. That is, the head height H deviates from the optimum value that can ensure image quality equal to or higher than the reference level. In this case, the quality of the recorded image is degraded.

Figure 4A:
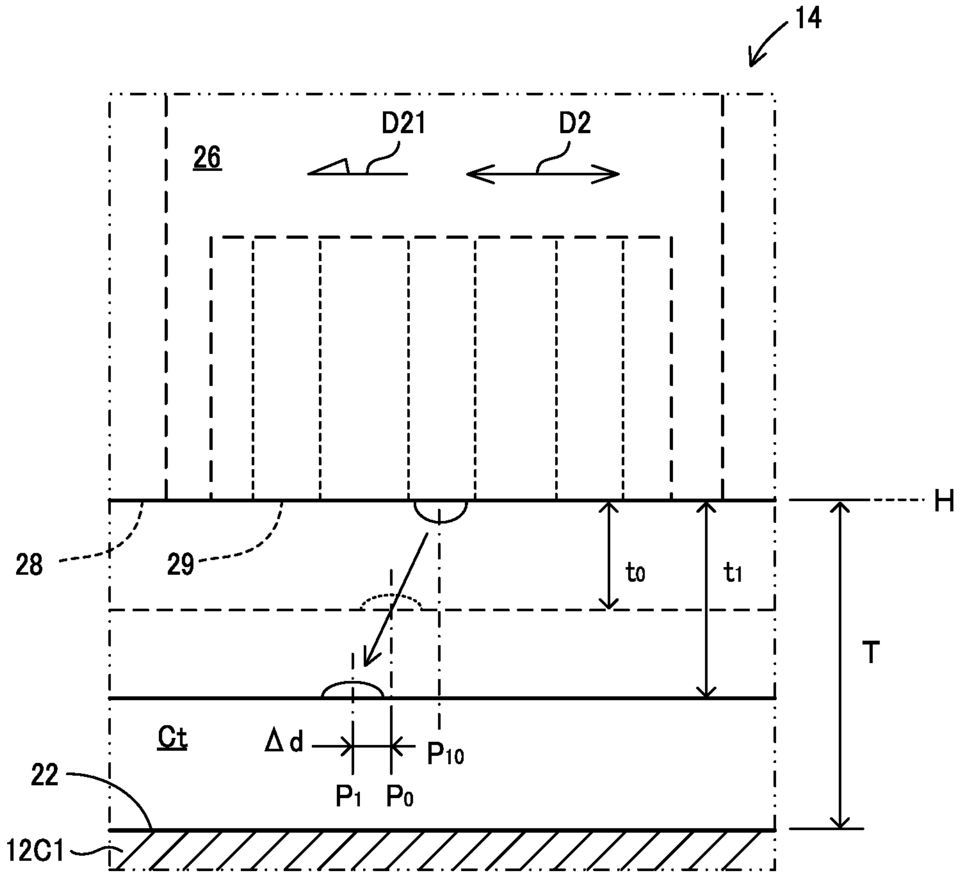
FIG. 4A is a schematic diagram for explaining a cause of deterioration of image quality.

For example, as shown in FIG. 4A, when the thickness of the recording medium Ct is too small with respect to the interval T, the separation distance t1 becomes larger than the design interval t0. In this case, ink droplets are ejected during scanning by the recording unit 14, and the distance required for the ink droplets to reach the recording surface increases. Therefore, in a case where the recording unit 14 moves in one moving direction D21 of the scanning direction D2, the ink droplet landing position P1 shifts a distance Δd in the moving direction D21 from a reference landing position P0 at the design interval t0. Such a deviation (ad) similarly occurs in a case where the recording unit 14 moves in an other movement direction D22. In this case, the recorded image becomes blurred or unclear, and the image quality deteriorates.

Figure 4B:
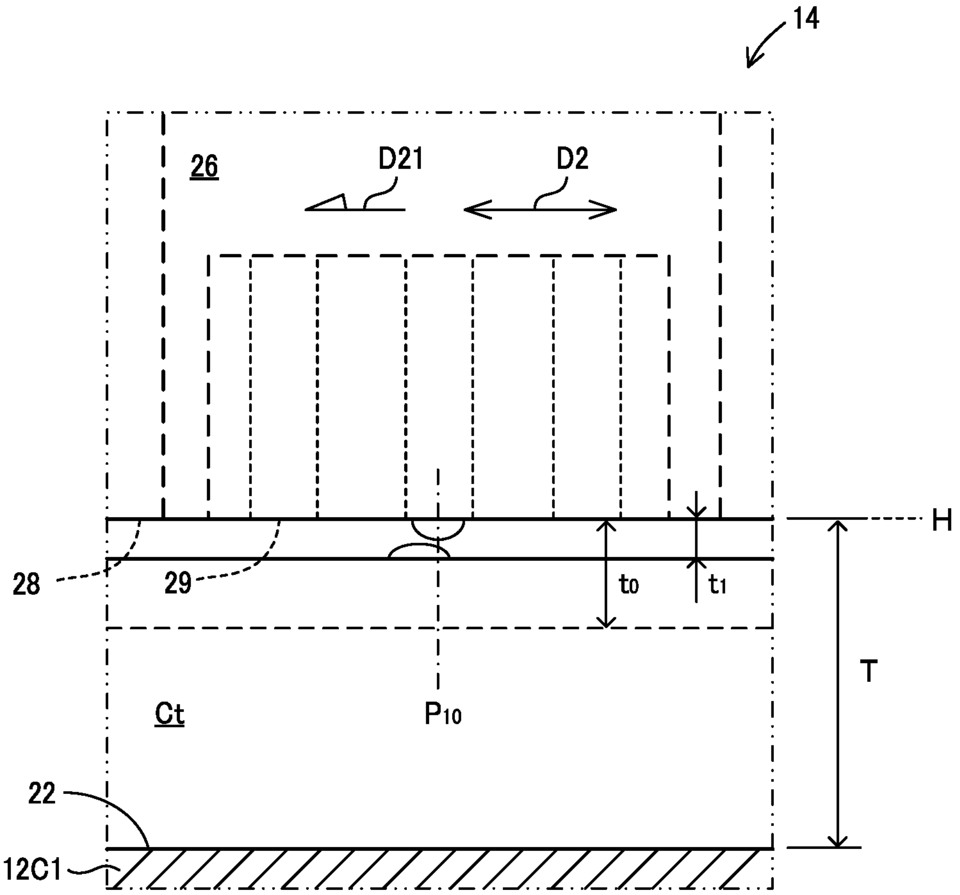
FIG. 4B is a schematic diagram for explaining a cause of deterioration of image quality.

In addition, for example, as shown in FIG. 4B, when the thickness of the recording medium Ct is too large with respect to the interval T, the separation distance t1 becomes smaller than the design interval t0. In this case, the interval between the ink ejection surface 28 and the recording surface of the recording medium Ct becomes too small, and the ink ejection surface 28 may come into contact with the recording surface. In this case, image rubbing occurs due to contact, and image quality deteriorates.

Therefore, the recording apparatus 10 of the present embodiment is provided with a raising/lowering mechanism 15, and as will be described later, is configured so that the distance of the interval T, that is, the relative position of the recording head 26 with respect to the recording medium Ct can be adjusted by the raising/lowering mechanism 15.

As shown in FIG. 1, an imaging portion 19 is provided above the conveying surface 22 of the annular belt 12C. More specifically, the imaging portion 19 is provided above the conveying surface 22 and further on the downstream side than the recording unit 14 in the conveying direction D1. The imaging portion 19 is a device that reads an image on the recording surface of the recording medium Ct on the conveying surface 22, and is, for example, a contact image sensor (CIS) having a plurality of imaging elements arranged in the scanning direction D2. In the imaging portion 19, an imaging element receives light emitted from a light source onto the recording surface of the recording medium Ct and reflected from the recording surface, and the imaging portion 19 generates image data having a density corresponding to intensity of the light.

In this embodiment, the imaging portion 19 reads an image in an entire width direction on the recording surface of the recording medium Ct that is moved in the conveying direction D1. In a case where a test pattern, which will be described later, is recorded on the recording surface of the recording medium Ct by the recording head 26, the imaging portion 19 reads an image on the recording surface including the test pattern based on a control signal from the control device 80. Data of the read image is stored in a RAM 83 (see FIG. 5), a storage device 84 (see FIG. 5), or the like by the control device 80.

As shown in FIG. 1, the discharge unit 13 is provided further on the downstream side than the conveying unit 12 in the conveying direction D1. The discharge unit 13 has a drive roller 13A, a driven roller 13B, and an annular belt 13C stretched over the drive roller 13A and the driven roller 13B. In the discharge unit 13 as well, the drive roller 13A is connected to a motor (not shown) via a transmission member such as a gear or belt. The drive roller 13A is rotationally driven by the motor being driven and controlled by a control signal from the control device 80. Thus, the recording medium Ct held on the upper surface of the annular belt 13C is conveyed in the conveying direction D1.

In this embodiment, in a case where the recording medium Ct is at a position where recording by the recording head 26 of the recording unit 14 is possible, the discharge unit 13 is intermittently driven in synchronization with the conveying unit 12. When the recording medium Ct is completely transferred to the discharge unit 13, the discharge unit 13 is continuously driven to eject the recording medium Ct from the discharge port 24 to the outside. A discharge tray 23 is provided outside the discharge port 24, and the discharged recording medium Ct is held by the discharge tray 23. Note that ink adhering to the recording medium Ct naturally dries while passing through the discharge unit 13.

The raising/lowering mechanism 15 is provided below the conveying unit 12. The raising/lowering mechanism 15 adjusts the head height H (distance of the interval T) of the recording head 26 by raising or lowering the conveying unit 12 and changing the relative position of the recording head 26 with respect to the conveying surface 22 of the recording medium Ct. The raising/lowering mechanism 15 includes a lift plate 15A that supports the conveying unit 12, a link arm 15B attached to the lift plate 15A, a main portion 15C that supports the link arm 15B so as to be vertically movable, and a motor 32 that applies a driving force to the link arm 15B. Note that the raising/lowering mechanism 15 is not limited to such a configuration, and any configuration can be applied as long as the mechanism is capable of raising and lowering the conveying unit 12 by the driving force of the motor 32.

The motor 32 is provided with a rotational position sensor such as a rotary encoder. The control portion 81 can control the raised or lowered position of the lift plate 15A and the amount of raising or lowering of the lift plate 15A based on an output value of the rotary encoder. In addition, the control portion 81 can also control a relative position of the recording head 26 based on the output value of the rotary encoder. Further, in a case where a user inputs a setting value related to the head height H from an operation display portion 18, the control portion 81 can drive and control the raising/lowering mechanism 15 so that the position becomes the position indicated by the setting value.

The raising/lowering mechanism 15 supports the conveying unit 12 from below and vertically raises or lowers the conveying unit 12 with respect to the recording head 26. That is, the raising/lowering mechanism 15 separates or brings closer together the conveying unit 12 and the recording head 26 by moving the conveying unit 12 relative to the recording head 26. More specifically, the raising/lowering mechanism 15 moves the conveying unit 12 between a recording position (position indicated by a solid line in FIG. 1) where printing by the recording unit 14 is possible, and a maintenance position (position indicated by a dashed line in FIG. 1) a specified distance below the recording position.

In addition, in the raising/lowering mechanism 15, the motor 32 is driven and controlled by a control signal from the control device 80. Thus, the raising/lowering mechanism 15 adjusts the interval between the conveying surface 22 and the ink ejection surface 28 of the recording head 26, and adjusts the recording position to an appropriate position.

The maintenance unit 16 and the cap unit 17 are arranged below the discharge unit 13. The maintenance unit 16 performs a wiping operation of wiping the ink ejection surface 28 and cleaning the ink ejection surface 28. When the wiping operation is executed by the maintenance unit 16, the conveying unit 12 is arranged at the maintenance position. In this state, the maintenance unit 16 is moved to a position below the recording unit 14.

The cap unit 17 is moved below the recording unit 14 when capping the ink ejection surface 28 (see FIG. 2) of the recording head 26. The cap unit 17 then moves upward from below the recording unit 14 to cover the ink ejection surface 28 of the lower surface of the recording head 26 to protect the ink ejection surface 28 from drying.

Figure 5:
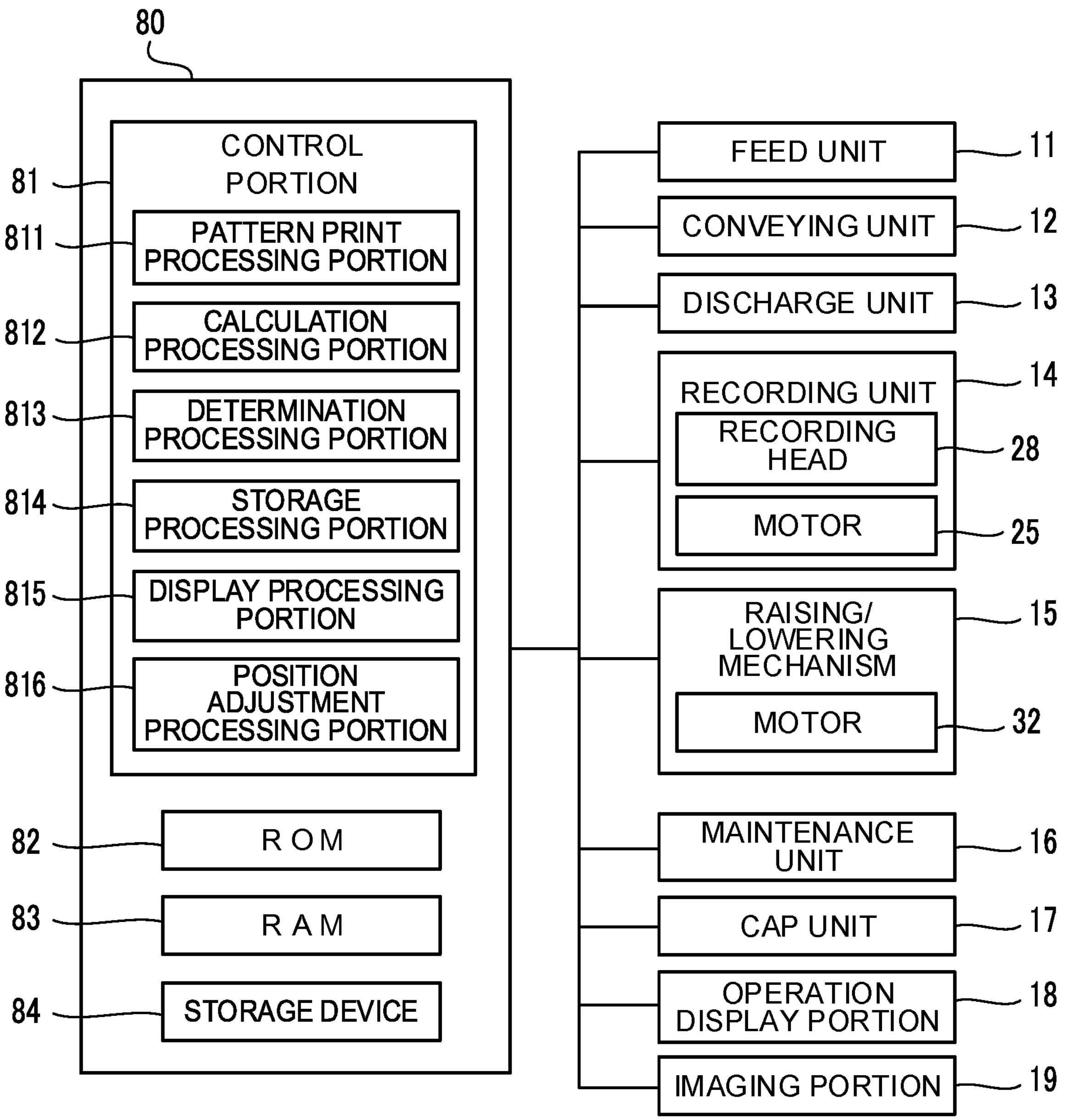
FIG. 5 is a block diagram showing a configuration of an inkjet recording apparatus.

FIG. 5 is a block diagram showing the configuration of the recording apparatus 10. As shown in FIG. 5, the control device 80 includes a control portion 81, a ROM 82, a RAM 83, a storage device 84, and the like. The control device 80 also includes a signal interface that converts a signal to be input or output into a signal having a specified format, a communication device that performs data communication with other devices, and the like. The control device 80 is electrically connected to each component of the recording apparatus 10, and controls each component of the recording apparatus 10 based on image data input from the outside, and executes image recording processing. In addition, the control device 80 executes various types of data processing, head height adjustment processing, which will be described later, and the like.

The storage device 84 is a computer-readable storage device. The storage device 84 is an example of a specified storage portion according to the present disclosure. The storage device 84 is, for example, a flash memory or a hard disk drive. The storage device 84 stores a specified control program executed by the control portion 81, various types of data used for various types of processes executed by the control portion 81, and the like. In addition, the storage device 84 also stores identification information indicating a type of the recording medium Ct and the optimum head height H in a case where image recording is performed on the recording medium Ct in a state of being associated with each other.

Note that the storage portion according to the present disclosure is not limited to the storage device 84 provided in the control device 80. For example, the storage portion may be an external storage device connected to the control portion 81 via a network by the communication device. In this case, the control portion 81 performs processing for storing data in the external storage device and retrieving data from the external storage device by communicating with the external storage device via the network.

The operation display portion 18 includes an operation portion that receives operations of the user using the recording apparatus 10. The operation portion is, for example, operation buttons, a touch panel, and the like. For example, the operation portion receives an execution instruction for executing head height adjustment processing, which will be described later, and an input operation for specifying information and data necessary for the processing. That is, the operation portion includes an execution key for inputting the execution instruction, various types of input keys for performing the input operation, a cancel key for interrupting the process, and the like. In addition, the operation display portion 18 includes a display portion for displaying various types of information. The display portion is, for example, a panel display device such as a liquid crystal display unit.

The control portion 81 has a computing device such as a CPU. The control portion 81 is a processor that executes various types of data processing and control by executing a computer program. The control portion 81 performs overall control of each component of the recording apparatus 10 based on image data input from the outside, thereby recording an image corresponding to the image data on the recording surface of the recording medium Ct. In addition, the control portion 81 executes head height adjustment processing, which will be described later, according to the procedure of the flowchart shown in FIG. 5.

The ROM 82 is a non-volatile storage device, and the RAM 83 is a computer-readable volatile storage device. The ROM 82 stores a specified control program, a program for executing head height adjustment processing, which will be described later, and the like. The RAM 83 is used as temporary storage memory for various types of processes executed by the control portion 81. The RAM 83 temporarily stores the computer program executed by the CPU of the control portion 81 and stores data that is output and referred to while the CPU of the computer portion 81 executes various types of processes. Note that the RAM 83 may be used as a specified storage portion according to the present disclosure.

The control portion 81 includes a plurality of processing portions achieved by executing the computer program. More specifically, the control portion 81 includes a pattern print processing portion 811, a calculation processing portion 812, a determination processing portion 813, a storage processing portion 814 (an example of a storage processing portion according to the present disclosure), a display processing portion 815 (an example of an output processing portion according to the present disclosure), a position adjustment processing portion 816, and the like. Each of these processing portions is not limited to being achieved by the control portion 81, and may be achieved by, for example, a plurality of processors. In addition, each processing portion is not limited to being a processing portion achieved by the control portion 81, and may be configured by, for example, an electronic circuit capable of achieving the function of each processing portion.

The pattern print processing portion 811 performs processing for causing the recording head 26 to record a specified test pattern on the recording surface of the recording medium Ct. For example, in a case where an image is recorded on the recording medium Ct whose thickness information is not registered in the recording apparatus 10, the user operates the operation display portion 18 of the recording apparatus 10 to input the identification information of the recording medium Ct (for example, the name of the medium). After that, the user presses and operates an execution key for executing head height adjustment processing, which will be described later, to cause the recording apparatus 10 to start the head height adjustment processing. In this case, the control portion 81 drives and controls the raising/lowering mechanism 15 to move the conveying unit 12 so that the head height H becomes a predetermined height H1. Here, the specified height H1 may be a position that maintains a sufficient interval T that prevents the recording surface of the recording medium Ct from coming into contact with the ink ejection surface 28 even when the recording medium Ct with an unknown thickness is conveyed on the conveying surface 22. After that, the pattern print processing portion 811 performs processing for recording the test pattern on the recording medium Ct set in the recording apparatus 10.

Here, the test pattern is a linear image elongated in the conveying direction D1 of the recording medium Ct. Note that the test pattern may have any shape, such as a rectangular shape, a dot shape, or the like, as long as the shape is such that the control portion 81 can determine the recording position of the test pattern on the image data captured by the imaging portion 19.

In this embodiment, the pattern print processing portion 811 executes a first print process for printing a first test pattern TP1 and a second print process for printing a second test pattern TP2. The first print process is a process in which the recording head 26 is moved in the first direction D21 of the scanning direction D2, and ink droplets are ejected toward the recording surface of the recording medium Ct during the movement to print the first test pattern TP1 (see FIG. 6) on the recording surface. In addition, the second print process is a process in which the recording head 26 is moved in the second direction D22 of the scanning direction D2, and ink droplets are ejected toward the recording surface of the recording medium Ct during the movement to print the second test pattern TP2 (see FIG. 6) on the recording surface. The second direction D22 is a direction opposite to the first direction D21 in the scanning direction D2. The position where the second test pattern TP2 is printed is an example of the reference position according to the present disclosure.

In a case where the recording head 26 performs forward movement (movement in the first direction D21) and backward movement (movement in the second direction D22) along the scanning direction D2, in each movement process, the pattern print processing portion 811 prints each test pattern TP1, TP2 on the recording surface. More specifically, when the recording head 26 reaches a predetermined specified position P10, the pattern print processing portion 811 prints each of the test patterns TP1 and TP2 on the recording surface by ejecting ink droplets toward the recording surface.

Figure 6:
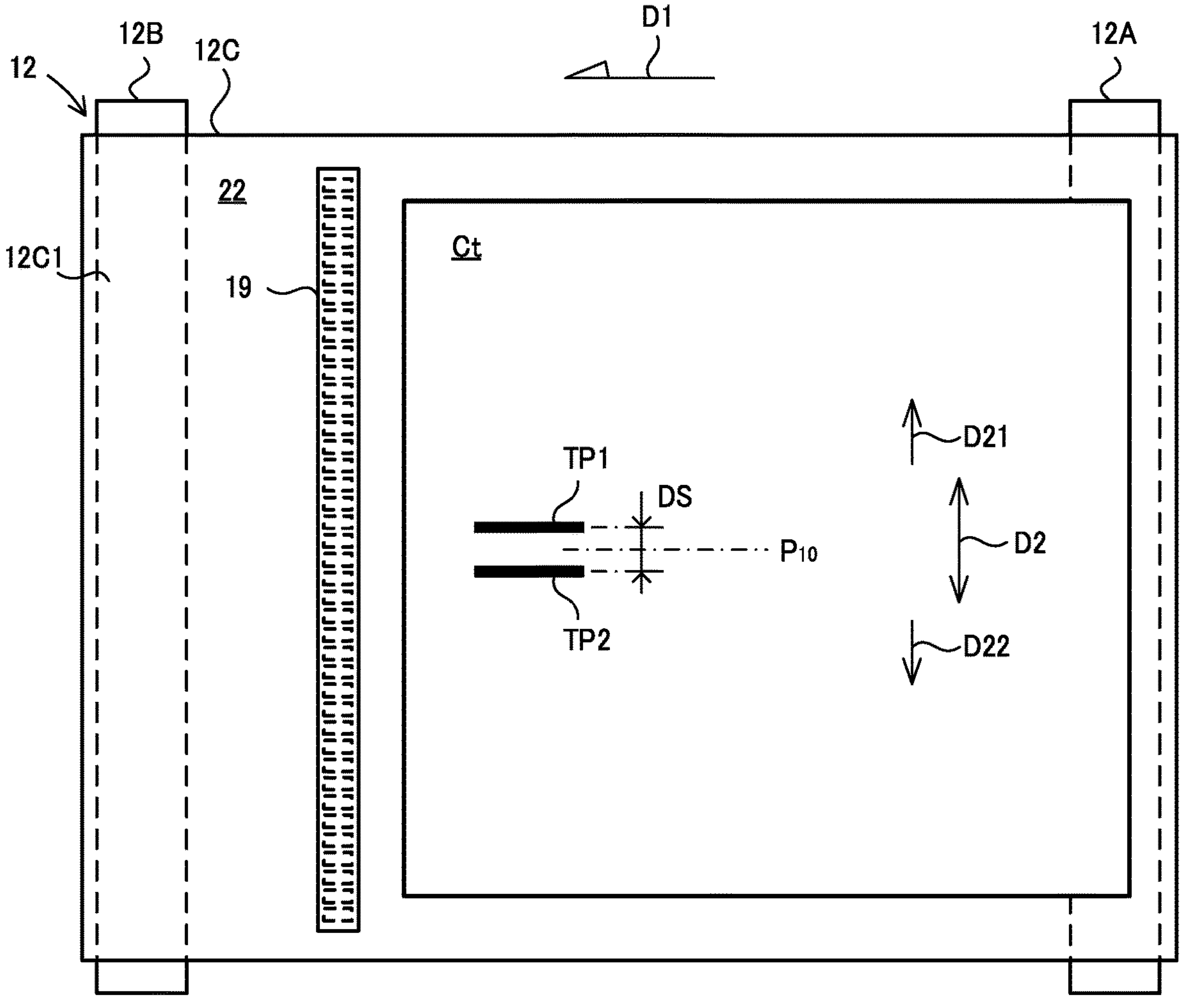
FIG. 6 is a diagram showing each test pattern printed on a recording surface of a recording medium.

Here, as shown in FIG. 6, the specified position P10 is a predetermined position on the recording surface of the recording medium Ct and a specific position in the scanning direction D2. In this embodiment, the specified position P10 is a central position in the scanning direction D2 on the recording surface of the recording medium Ct. That is, the specified position P10 is the center position in the width direction of the recording medium Ct.

When the recording head 26 reaches the specified position P10 while the recording head 26 is moving in the first direction D21, ink droplets are ejected toward the recording surface to print the test pattern TP1 on the recording surface. In addition, when the recording head 26 reaches the specified position P10 while the recording head 26 is moving in the second direction D22, ink droplets are ejected toward the recording surface to print the test pattern TP2 on the recording surface. Note that the control portion 81 can determine that the recording head 26 has reached the specified position P10 based on a sense signal from a rotary encoder or the like provided in the motor 25.

Ink droplets ejected in the process of moving in the first direction D21 are ejected in a direction inclined in the movement direction D21 of the recording head 26 and land on the recording surface. In addition, ink droplets ejected in the process of moving in the second direction D22 are ejected in a direction inclined in the movement direction D22 of the recording head 26 and land on the recording surface. Therefore, the test patterns TP1 and TP2 are recorded at positions separated by a predetermined interval DS (hereinafter referred to as "pattern interval DS") in the scanning direction D2 so as to sandwich the specified position P10 therebetween.

When the test patterns are printed on the recording surface of the recording medium Ct, the imaging portion 19 reads an image including the test patterns TP1 and TP2 (hereinafter referred to as a "pattern image").

The calculation processing portion 812 performs a process of calculating the pattern interval DS between the first test pattern TP1 and the second test pattern TP2 included in the pattern image based on the pattern image read by the imaging portion 19. The pattern interval DS is a distance between the respective center positions of the test patterns TP1 and TP2. The pattern interval DS can be calculated based on the number of pixels between each test pattern in the pattern image and the reading resolution of the imaging portion 19 (for example, the number of pixels per inch).

The determination processing portion 813 performs a process for determining the head height H of the recording head 26 (height position of the recording head 26) according to the recording medium Ct based on the pattern interval DS. The head height H is the interval of the interval T such that the separation distance t1 (see FIGS. 3 and 4A) between the ink ejection surface 28 and the recording surface of the recording medium Ct becomes the design interval t0 (see FIG. 4A) in a case where the recording medium Ct on which the test pattern is printed is conveyed on the conveying surface 22.

Here, after adjusting the head height H so that the separation distance t1 becomes the design interval t0, the test patterns TP1 and TP2 are printed on a reference recording medium having a known thickness, and the interval between the patterns is taken to be DS0. In this case, the interval DS0, the pattern interval DS, the design interval t0, and the separation distance t1 (the distance between the ink ejection surface 28 and the recording surface) are in a proportional relationship of DS0:DS=t0:t1. Here, the interval DS0 is calculated in advance by the control portion 81 based on the pattern image including the test patterns TP1 and TP2 printed on the reference recording medium.

From the proportional relationship, the separation distance t1 can be expressed by the following equation (1).

$$t1=(DS\cdot t0)/DS0 \quad (1)$$

Here, when the predetermined specified height H1 (the distance of the interval T) is used in a case where the head position adjustment process is performed, a thickness k of the recording medium Ct can be expressed by the following equation (2).

$$k=H1-t1=H1-(DS\cdot t0)/DS0 \quad (2)$$

Therefore, the optimum value of the head height H of the recording head 26 according to the recording medium Ct is derived from a relational expression indicated by equation (3) below.

$$H=k+t0=H1-(DS\cdot t0)/DS0+t0 \quad (3)$$

In this embodiment, the relational expression and information for deriving the relational expression are stored in a storage device 84, and the determination processing portion 813 calculates the appropriate head height H using the relational expression and information in the storage device 84 and the pattern interval DS calculated by the calculation processing portion 812.

The storage processing portion 814 performs a process of associating the identification information (for example, medium name) of the recording medium Ct input by the user from the operation display portion 18 with the head height H determined by the determination processing portion 813, and storing the result in the storage device 84.

The display processing portion 815 performs a process for outputting information related to the head height H determined by the determination processing portion 813. Information related to the head height H may be a numerical value of the head height H itself, or may indicate whether the head height H is higher or lower than a setting value of the head height H (optimum setting value). An output destination is, for example, an external device connected via a network to the recording apparatus 10 or is a display portion of the operation display portion 18. The external device is, for example, a terminal device or an information processing device possessed by a user who uses the recording apparatus 10. In addition, the display processing portion 815 reads the identification information and the head height H from the storage device 84 and performs processing for displaying the identification information and the head height H on the display portion of the operation display portion 18.

The position adjustment processing portion 816 performs processing that causes the raising/lowering mechanism 15 to adjust the relative position of the recording head 26 with respect to the conveying surface 22 so that the recording head 26 is arranged at the head height H determined by the determination processing portion 813.

In a conventional recording apparatus, in order to determine the distance to a recording medium of unknown thickness, not only is a test pattern printed on the recording medium, but it is necessary to print a test pattern on a recording medium of known thickness in advance, and thus the printing work is complicated.

However, since the recording apparatus 10 according to the present embodiment is configured as described above, it is possible to appropriately determine the height position of the recording head according to the recording medium such as fabric or paper. That is, with the recording apparatus 10, even in a case where the image recording process is performed on a recording medium Ct of unknown thickness, it is possible to determine a setting value (optimal setting value) of the head height H of the recording head 26 that can ensure image quality equal to or higher than a reference level. In addition, it is possible to automatically adjust the position of the recording head 26 in the height direction to an appropriate position based on the determined setting value.

Figure 7:
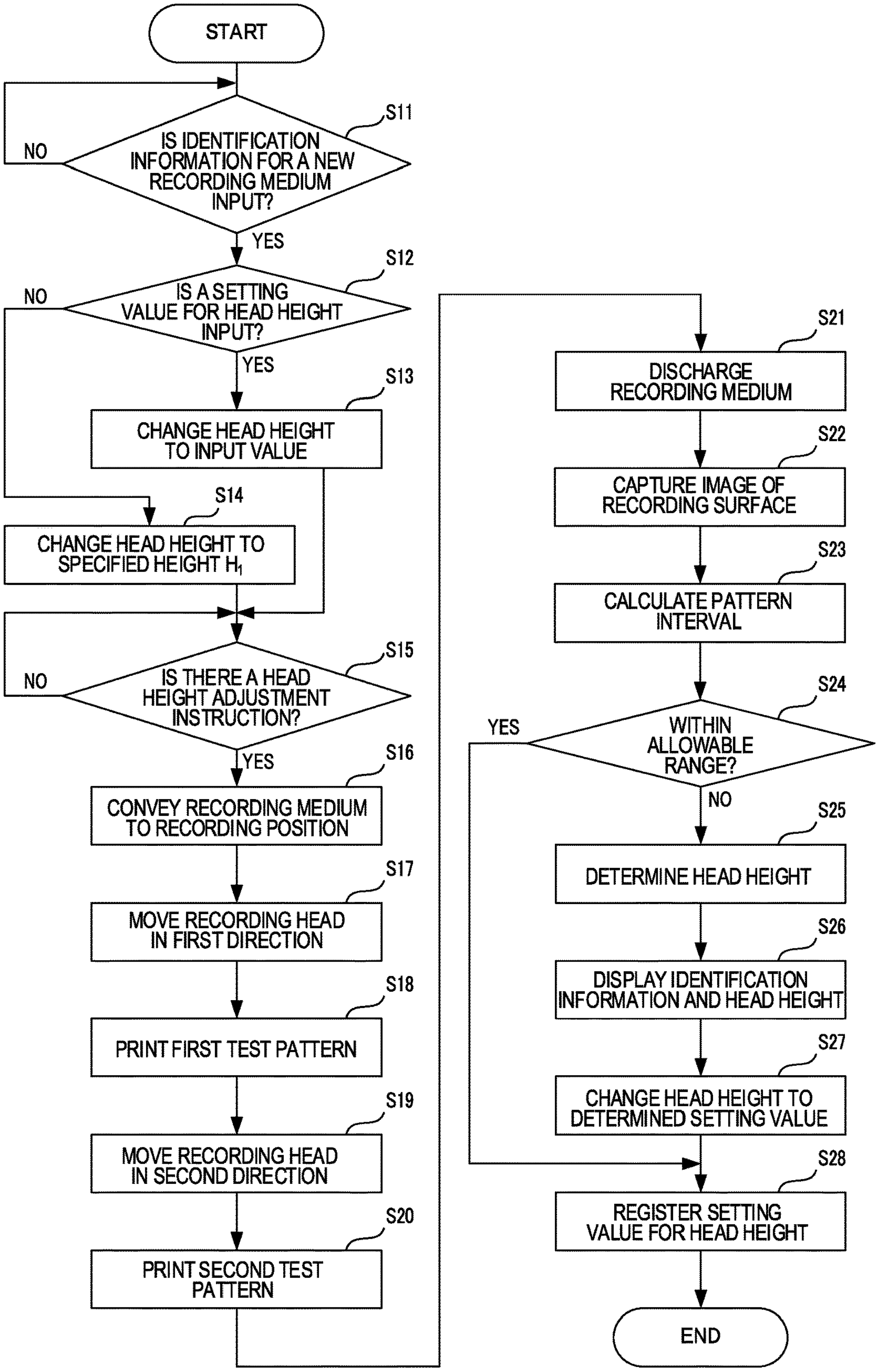
FIG. 7 is a flowchart showing an example of a procedure of a head height adjustment process executed by a control portion of an inkjet recording apparatus.

A head height adjustment process and a head height adjustment method executed by the control portion 81 will be described below with reference to the flowchart of FIG. 7. Here, FIG. 7 is a flowchart showing an example of a procedure of the head height adjustment process executed by the control portion 81 of the recording apparatus 10. In FIG. 7, S11, S12, and so on, represent the numbers of the processing procedures (steps).

Note that in the following description, it is presumed that the operation mode of the recording apparatus 10 has been changed from a normal print mode to an adjustment mode for adjusting the head height H of the recording head 26 by the user operating the operation display portion 18 before recording an image on the recording medium Ct whose thickness information is not registered in the recording apparatus 10.

First, in step S11, the control portion 81 determines whether or not information of a new recording medium Ct has been input in the adjustment mode. For example, the user inputs the identification information (such as the name of the recording medium) from the operation display portion 18 as the information of the recording medium Ct whose thickness information is not registered in the recording apparatus 10. When the identification information is input, the control portion 81 registers the identification information in the recording apparatus 10. More specifically, the identification information is registered as information of the new recording medium Ct in the registration data of the recording medium Ct stored in the storage device 84.

After that, in step S12, the control portion 81 determines whether or not the setting value of the head height H (height setting value) corresponding to the new recording medium Ct has been input. For example, the user can input an arbitrary height setting value from the operation display portion 18 as a temporary setting value of the head height H corresponding to the new recording medium Ct. When the height setting value is input, the control portion 81 associates the height setting value with the identification information registered in step S11, and registers the height setting value in the registration data.

In the next step S13, the control portion 81 drives and controls the raising/lowering mechanism 15 to raise or lower the conveying unit 12 so that the head height H of the recording head 26 is at the position indicated by the height setting value input in step S12. That is, the control portion 81 drives and controls the raising/lowering mechanism 15 to adjust the interval of the interval T so that the head height H becomes the height setting value. After that, the process proceeds to step S15.

On the other hand, in a case where the height setting value is not input in step S12, the control portion 81 reads the specified height H1 stored in advance in the storage device 84 or the like, and drives and controls the raising/lowering mechanism 15 to raise or lower the conveying unit 12 so that the head height H of the recording head 26 becomes the specified height H1 (S14). After that, the process proceeds to step S15.

In step S15, it is determined whether or not an adjustment instruction for adjusting the head height H has been input. When the user inputs an execution instruction by operating the operation display portion 18, the control portion 81 receives an input signal of the execution instruction and determines that the adjustment instruction has been input.

When the adjustment instruction is input, the control portion 81 conveys the recording medium Ct set on the upper surface of the feed unit 11 to the recording position below the recording head 26 (S16). After that, the control portion 81 performs processing (S17 to S20) for printing the test patterns on the recording surface of the recording medium Ct that is paused at the recording position. Note that this process is executed by the pattern print processing portion 811 (see FIG. 5).

More specifically, first, the control portion 81 moves the recording head 26 in the first direction D21 from a specified standby position (S17). When the recording head 26 reaches the specified position P10, the control portion 81 ejects ink droplets onto the recording surface of the recording medium Ct to print the first test pattern TP1 on the recording surface (S18). In addition, the control portion 81 moves the recording head 26 in the second direction D22 by returning from the end portion on the first direction D21 side (S19). When the recording head 26 reaches the specified position P10 again, the control portion 81 causes the recording head 26 to eject ink droplets toward the recording surface of the recording medium Ct to print the second test pattern TP2 on the recording surface (S20). Note that steps S17 to S20 are an example of the test pattern printing step according to the present disclosure.

After the test patterns TP1 and TP2 are printed, the control portion 81 stops the operation of the recording head 26 and performs processing to discharge the recording medium Ct (S21). In addition, the control portion 81 causes the imaging portion 19 to read the pattern image including the test patterns TP1 and TP2 in the process of discharging the recording medium Ct (S22). After that, the control portion 81 calculates the interval DS (pattern interval DS) between the test pattern TP1 and the test pattern TP2 based on the pattern image (S23). This processing is processing executed by the calculation processing portion 812 (see FIG. 5). Note that step S22 is an example of the imaging step according to the present disclosure. In addition, step S23 is an example of the interval calculation step according to the present disclosure.

When the pattern interval DS is calculated, the control portion 81, in step S24, determines whether or not the pattern interval DS is within a predetermined allowable range. Here, the allowable range is a numerical range obtained by adding a specified margin (allowable amount) to the interval DS0 when the interval between the ink ejection surface 28 and the recording surface of the recording medium Ct is the design interval t0. For example, in a case where the margin is taken to be $\alpha$, the allowable range is from "DS0$-\alpha$" to "DS0$+\alpha$".

In step S24, in a case where the pattern interval DS is determined to be within the allowable range, that is, in a case where the pattern interval DS is determined to be equal to or greater than a lower limit value of the allowable range and equal to or less than an upper limit value of the allowable range, the control portion 81 registers the current head height H in the registration data (S28). After that, this series of processing ends.

On the other hand, in a case where it is determined in step S24 that the pattern interval DS is outside the allowable range, that is, in a case where it is determined that the pattern interval DS is smaller than the lower limit of the allowable range or larger than the upper limit of the allowable range, the control portion 81 proceeds to the next step S25, and performs processing (head height determination processing) for determining the optimum setting value of the head height H corresponding to the recording medium Ct. This processing is processing executed by the determination processing portion 813 (see FIG. 5). The processing of step S25 is performed using the relational expression indicated as equation (3) above. Note that step S25 is an example of the height position determination step according to the present disclosure.

When the head height H is determined, the control portion 81, in step S26, performs processing to output the setting value of the determined head height H to the operation display portion 18 and display the setting value on the display portion of the operation display portion 18. At this time, the control portion 81 reads the identification information of the recording medium Ct from the storage device 84, associates the identification information with the setting value of the head height H, and displays the result on the display portion. This processing is processing executed by the display processing portion 815 (see FIG. 5).

After that, in step S27, the control portion 81 drives and controls the raising/lowering mechanism 15 to raise or lower the conveying unit 12 so that the head height H of the recording head 26 is at the position indicated by the height setting value determined in step S25. That is, the control portion 81 drives and controls the raising/lowering mechanism 15 to change the interval of the interval T so that the head height H becomes the height setting value. This processing is processing executed by the position adjustment processing portion 816 (see FIG. 5). After that, the setting value of the head height H after the change is registered in the registration data (S28), and this series of processing ends. Note that the processing of step S28 is processing executed by the storage processing portion 814 (see FIG. 5).

As described above, according to the present embodiment, the test patterns TP1 and TP2 are printed on the recording surface of the recording medium Ct by the control portion 81 (S17-S20), the pattern image including the test patterns TP1 and TP2 is read by the imaging portion 19, after that, the interval DS (pattern interval DS) between the test patterns TP1 and TP2 is calculated (S23), then, the optimum setting value for the head height H is determined based on the pattern interval DS (S25). Thus, even in a case where the image recording process is performed on a recording medium Ct whose thickness is unknown, in the adjustment mode before the image recording process, it is possible to determine a setting value (optimum setting value) of the head height H of the recording head 26 that can ensure image quality equal to or higher than a reference level.

In addition, the control portion 81 automatically adjusts the position of the recording head 26 in the height direction to an appropriate position so that the height position indicated by the determined optimum setting value is obtained. Thus, the user can be saved the trouble of manually adjusting the head height H.

In addition, since the control portion 81 displays the optimum setting value for the head height H on the display portion of the operation display portion 18, the user is able to know the optimum setting value for the head height H corresponding to the recording medium Ct.

Note that in the embodiment described above, an example in which the position in the height direction of the recording head 26 is automatically changed by the raising/lowering mechanism 15 has been described; however, for example, in a case where the raising/lowering mechanism 15 does not have an automatic raising/lowering function, it is possible, for example, for the user to confirm the setting value displayed on the operation display portion 18 and input the numerical value as the head height H of the recording head 26 from the operation display portion 18. In this case, the control portion 81 drives and controls the raising/lowering mechanism 15 based on the input setting value to raise or lower the conveying unit 12 so that the head height H of the recording head 26 is at the position indicated by the input setting value.

In addition, in the embodiment described above, a processing example of recording one first test pattern TP1 and one second test pattern TP2 on the recording surface of the recording medium Ct has been described; however, the present disclosure is not limited to this processing example. For example, sets of two, the first test pattern TP1 and the second test pattern TP2, may be set, and a plurality of such sets may be recorded on the recording surface. It is preferable that the plurality of sets of test patterns be recorded at each of a plurality of positions separated in the scanning direction D2 on the recording surface of the recording medium Ct. In this case, the control portion 81 calculates the pattern intervals DS of each of the plurality of sets of test patterns from the pattern image read by the imaging portion 19, and calculates the average value of the pattern intervals DS. The control portion 81 obtains the optimum head height H using the average value and the relational expression shown in equation (3) above. With this configuration, the optimum value of the head height H can be determined with higher accuracy.

In addition, in the embodiment described above, a processing example in which two test patterns TP1 and TP2 are printed on the recording surface of the recording medium Ct has been described; however, processing is not limited to processing such as described in the present disclosure. For example, a processing example of printing only the first test pattern TP1 on the recording surface of the recording medium Ct can be considered. In this case, when a position (specified position) on the recording surface corresponding to the specified position P10 is taken to be a reference position, the control portion 81 calculates an interval DS from the reference position to the first test pattern TP1, and obtains the optimum head height H using this interval DS and the relational expression shown in the equation (3) above. Even in such a processing example, the optimum value of the head height H can be determined.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An inkjet recording apparatus, comprising:

a recording head configured to eject ink onto a recording medium while moving in a predetermined scanning direction;

a pattern print processing portion configured to cause the recording head to record a specified test pattern on a recording surface of the recording medium;

an imaging portion configured to capture an image of the recording surface including the test pattern;

a calculation processing portion configured to calculate an interval between the test pattern and a reference position on the recording surface based on the image of the recording surface; and a determination processing portion configured to determine a height position of the recording head according to the recording medium based on the interval; and further comprising:

one of either an output processing portion, or a head position adjustment portion and a position adjustment processing portion; wherein the output processing portion is configured to output information related to the height position determined by the determination processing portion;

the head position adjustment portion is configured to be able to adjust the height position by changing a relative position of the recording head with respect to a support surface of the recording medium; and the position adjustment processing portion is configured to cause the head position adjustment portion to change the relative position of the recording head based on the height position determined by the determination processing portion, wherein the pattern print processing portion executes a first printing process of moving the recording head in a first direction of the scanning direction to print a first test pattern at a specified position on the recording surface, and a second printing process of moving the recording head in a second direction opposite to the first direction in the scanning direction to print a second test pattern as the reference position at a specified position on the recording surface;

the calculation processing portion calculates the interval between the first test pattern and the second test pattern based on the image of the recording surface;

the pattern print processing portion records the test pattern at each of a plurality of positions separated in the scanning direction on the recording surface;

the calculation processing portion calculates an average value of the plurality of intervals corresponding to each of the plurality of test patterns included in the image of the recording surface; and the determination processing portion determines the height position based on the average value.

2. The inkjet recording apparatus according to claim 1, wherein the determination processing portion calculates the height position corresponding to the interval using a relational expression indicating a relationship between the interval and the height position.

3. The inkjet recording apparatus according to claim 1, further comprising:

a storage processing portion configured to associate identification information of the recording medium and the height position determined by the determination processing portion and store the identification information and the height position in a specified storage portion; wherein the output processing portion reads the identification information and the height position from the storage portion and displays the identification information and the height position on a specified display portion.

4. A head position determining method comprising:

a test pattern printing step of recording a specified test pattern on a recording surface of a recording medium by ejecting ink from a recording head while moving the recording head in a predetermined scanning direction, executing a first printing process of moving the recording head in a first direction of the scanning direction to print a first test pattern at a specified position on the recording surface, and a second printing process of moving the recording head in a second direction opposite to the first direction in the scanning direction to print a second test pattern as the reference position at a specified position on the recording surface, recording the test patterns at the specified position and the reference position separated in the scanning direction on the recording surface;

an image capturing step of capturing an image of the recording surface including the test pattern;

an interval calculation step of calculating an interval between the first test pattern and the second test pattern based on the image of the recording surface, and calculating an average value of a plurality of intervals corresponding to each of the plurality of test patterns included in the image of the recording surface; and a height position determination step of determining a height position of the recording head according to the recording medium based on the interval and the average value.

* * * * *